United States Patent
Domini et al.

[11] Patent Number: 6,085,206
[45] Date of Patent: *Jul. 4, 2000

[54] METHOD AND SYSTEM FOR VERIFYING ACCURACY OF SPELLING AND GRAMMATICAL COMPOSITION OF A DOCUMENT

[75] Inventors: Maria-Nancy A. Domini, Bellevue; Ronald A. Fein, Seattle; Anthony D. Krueger, Redmond, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,227

[22] Filed: Jun. 20, 1996

[51] Int. Cl.[7] ................................... G06F 17/21
[52] U.S. Cl. .......................... 707/533; 345/347
[58] Field of Search ................... 707/530–534, 707/540; 345/326, 347; 704/1, 9, 10

[56] References Cited

U.S. PATENT DOCUMENTS 5,437,036  7/1995  Stamps et al. .
5,706,502  1/1998  Foley et al. ............................ 707/10

FOREIGN PATENT DOCUMENTS 0 513 918 A1  11/1992  European Pat. Off. .

OTHER PUBLICATIONS

Lipschutz, Finite Mathematics, p. 68, 1966.
"Interactive Author–Assistance Tool," IBM Technical Disclosure Bulletin, vol. 28, No. 12, May 1986, New York, U.S., pp. 5284–5286.
"Activating Multiple Spelling Dictionaries Concurrently," IBM Technical Disclosure Bulletin, vol. 32, No. 9A, Feb. 1, 1990, pp. 295–296.

*Primary Examiner*—Joseph H. Feild
*Attorney, Agent, or Firm*—Jones & Askew, LLP

[57] ABSTRACT

In an electronic word processing system environment, a system and method for verifying the accuracy of the grammatical composition of a sentence and the spelling of words within the sentence in an electronic document. A sentence is extracted from the electronic document. It is determined whether any of the words in the sentence are misspelled. If any of the words are misspelled, then an indication is displayed in a combined spelling and grammar dialog box. Determination is made whether the sentence is of proper grammatical composition. If the sentence does not have proper grammatical composition, then an indication is displayed in the combined spelling and grammar dialog box. These tasks may be repeated for each sentence in the document until the entire document has been proofed.

15 Claims, 6 Drawing Sheets

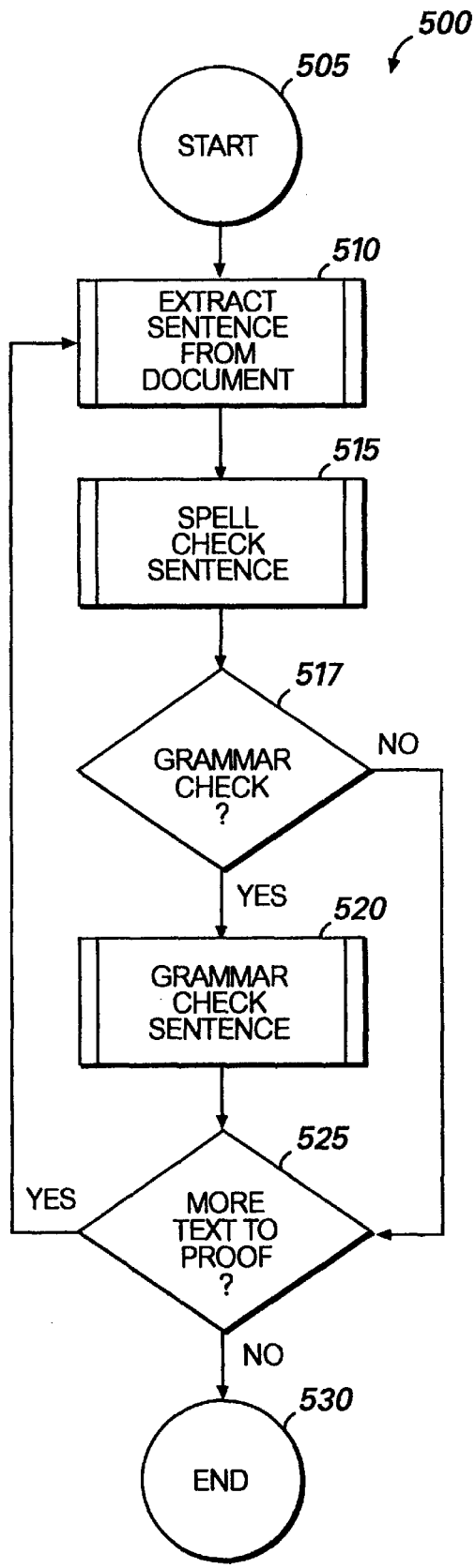
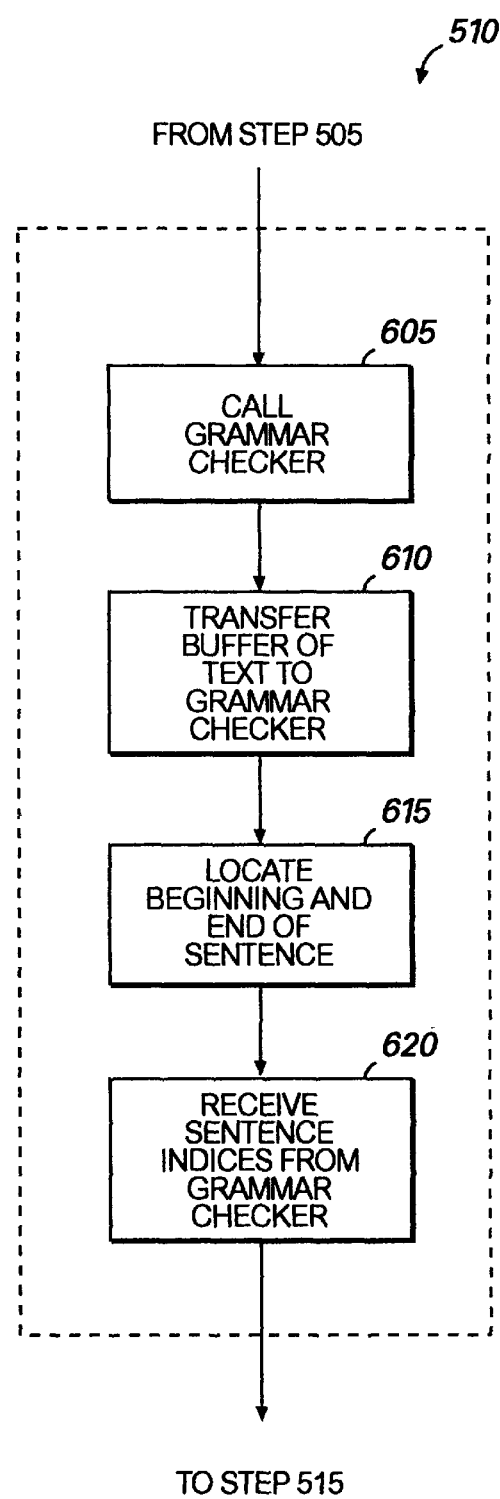
FIG. 5
FIG. 6

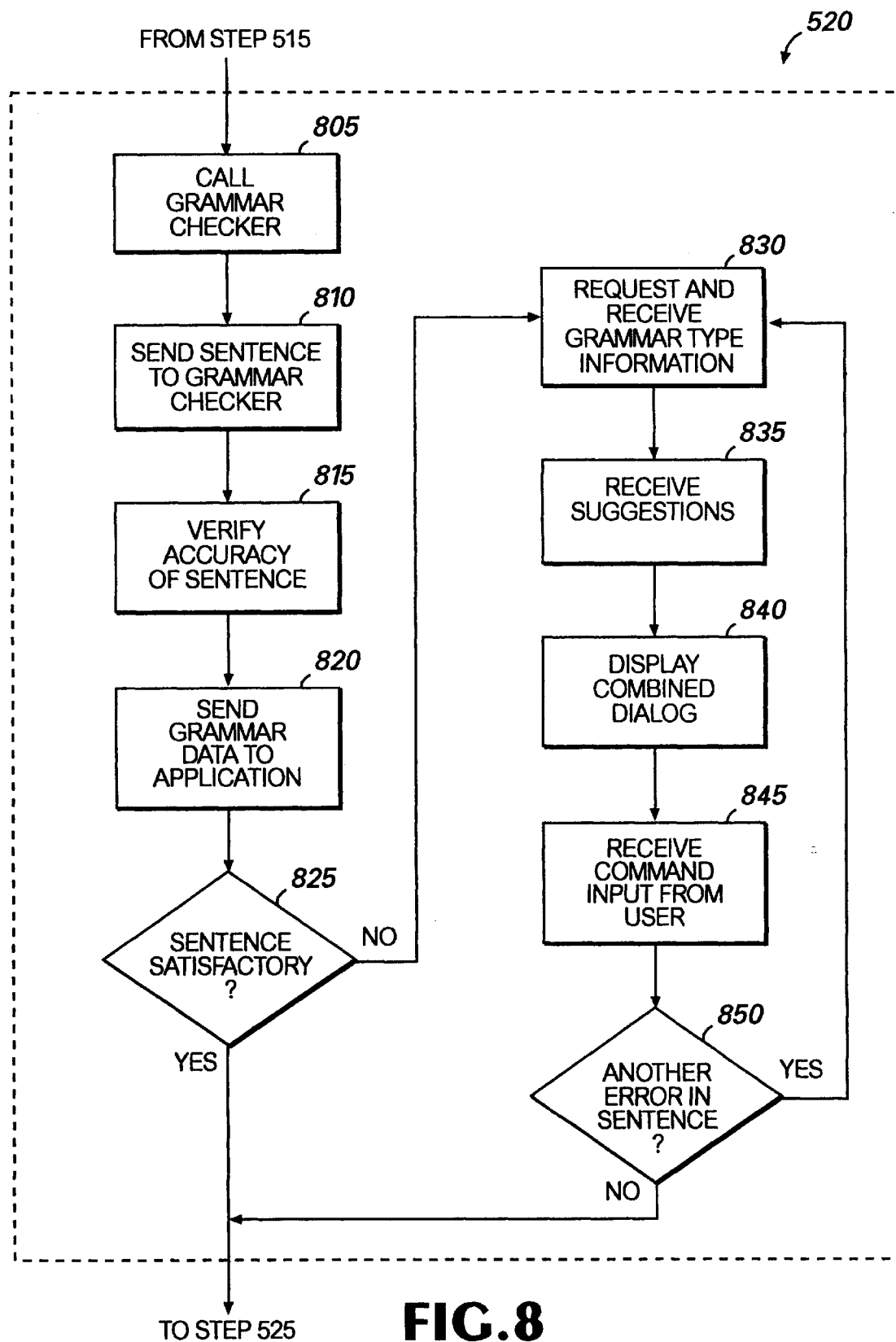

METHOD AND SYSTEM FOR VERIFYING ACCURACY OF SPELLING AND GRAMMATICAL COMPOSITION OF A DOCUMENT

TECHNICAL FIELD

This invention relates to a system and method for verifying the accuracy of spelling of words in an electronic document and verifying the accuracy of the grammatical composition of sentences in an electronic document.

BACKGROUND OF THE INVENTION

Documents prepared by non-professional writers often contain a number of errors. Some of these errors are simple spelling errors. Other errors may be somewhat more complex, such as orthographic errors or grammatical errors. Documents containing errors may reflect negatively on the writer of the document. For example, the recipient of a document containing errors may make the presumption that the writer lacks proper education, that the writer is lazy, that the writer prepared the document hastily or that the writer has other negative characteristics. Most writers want to avoid having these presumptions made about them and, thus, try to prepare their documents as accurately as possible.

Word processor program modules have been effective in helping users eliminate many errors in their documents. For example, most modem word processor program modules provide effective tools for proofing the composition of electronic documents. Two tools are spell checker program modules and grammar checker program modules. These tools help the writer of electronic documents correct many of the errors in their electronic documents.

Most spell checker program modules include a dictionary, or a list of words, to support spell check operations. To spell check a document, the spell checker program module compares the words in the document with the dictionary to determine if the words in the document correspond to, or match, words in the dictionary. If a word does not correspond to a word in the dictionary, then an indication is provided to the user that the word is not in the dictionary and, therefore, may be misspelled. In addition, many spell checker program modules provide other features, such as lists of suggestions to replace the misspelled word, indications of words that have been repeated and indications of words that may need to be capitalized.

Most grammar checker program modules check documents for sentences that may have grammatical errors or a weak writing style. If the grammar checker program module detects a possible error, then an indication is provided to the user. Grammar checker program modules typically check for subject-verb agreement, proper punctuation, passive verbs, etc. For many errors, the grammar checker program module will provide suggestions on ways to correct the sentence or improve the writing style of the sentence.

Spell checker program modules and grammar checker program modules were "stand-alone" products when they were initially introduced to personal computer users. In other words, spell checker program modules or grammar checker program modules were separate program modules from each other and from the word processor program module. These "stand-alone" program modules would scan documents of various formats, present errors, and suggest corrections, usually through a user interface, or dialog box. Later, the spell checker and grammar checker became integrated with word processor program modules. For example, the manufacturer of the word processor program module would license the spell checker program module or grammar checker program module from an independent software vendor and provide separate user interfaces for spelling and grammar.

The separate user interfaces for spell checker and grammar checker program modules have several drawbacks for users of word processor program modules. One drawback of separate user interfaces for spell checking and grammar checking is that the distinction between spelling and grammar is unnatural to the user. Separate spell checking and grammar checking is counterintuitive to the manual process of proofing a document. For example, rarely does a writer say to a friend, "Please proofread my document and point out all the spelling errors, but do not point out any of the grammatical errors." Instead, manual proofing of a document typically includes checking the document for spelling errors and grammatical errors. However, in many word processor program modules, the spell checking and grammar checking are performed separately and the results are displayed to the user in separate user interfaces.

A second drawback of separate user interfaces for spell checker and grammar checker program modules is that the user of the word processor program module must become familiar with two separate user interfaces and the two separate sets of commands associated with these user interfaces. The spell checker user interface and grammar checker user interface, however, are often inconsistent in operation. For example, in "WORD", version 7.0, a word processor program manufactured by Microsoft Corporation of Redmond, Wash., a misspelled word is displayed in a spelling dialog, but the sentence in which the misspelled word appears is not displayed in the dialog. On the other hand, in "WORD", version 7.0, the grammar dialog displays the entire sentence in which the grammatical error appears. Users of word processor program modules expect the user interfaces for spelling errors and grammatical errors to function similarly and might become confused or frustrated if they do not. The user also must spend time and effort to learn how to use the separate user interfaces for spelling and grammar. Often, users are unwilling to spend the time and effort and do not completely proof their documents.

Another drawback of the separate methods for spell checking and grammar checking a document is that users are often reluctant to conduct a full review of a document. To conduct a full review, the user must execute a spell check, return to the beginning of the document, and then execute a grammar check. This is a very unnatural process for users. In addition, some users forget to return to the beginning of a document and conduct a grammar check after conducting a spell check. Therefore, many users do not conduct a grammar check. Users that do not conduct a grammar check may write documents that contain errors that would have been readily detected by a grammar checker. Some of these undetected errors are errors that the user expects to be found by the spell checker, but they are not. For example, no spell checker would flag an error in the sentence "I think your the greatest", but a grammar checker would indicate that "your" should be "you're". Most users perceive this to be a spelling error even though it is an error that will only be detected by a grammar checker because every word in the sentence was found in the spelling dictionary. Thus, the separate methods for spell checking and grammar checking suffer from the additional drawback that users are discouraged from conducting a full review of their documents.

Therefore there is a need in the art for a word processor program module that simplifies the process of verifying the accuracy of spelling and grammatical composition of a document.

There is also a need for a word processor program module that verifies the accuracy of spelling and grammatical composition of a document in a manner that is intuitive to a user and that resembles the manual process of proofing a document.

There is also a need for a word processor program module that provides a user interface for combined spelling and grammar functions that are consistent in operation.

There is a further need for a word processor program module that encourages the user to conduct a grammar check and a spelling check so that the spelling and grammatical composition of documents is improved.

SUMMARY OF THE INVENTION

The present invention satisfies the above described needs by providing an improved system and method for spell checking and grammar checking an electronic document. A combined spelling and grammar dialog box is used to display possible spelling errors and grammatical errors to the user. The user only has to learn a few commands because the command buttons for spelling errors and grammatical errors are similar. In addition, the command buttons in the combined spelling and grammar dialog box are displayed in a logical manner. For example, command buttons representing the function of ignoring an error are arranged together and command buttons representing the function of executing a change are arranged together. The user only has to remember one command to both spell check and grammar check an electronic document and, thus, users will be encouraged to execute a complete proof of their documents.

Generally described, in one aspect, the present invention provides a method for verifying the accuracy of spelling and grammatical composition of sentences in an electronic document. The method includes extracting one of the sentences from the document. The spelling of the words in the document are checked. Next, the grammatical composition of the sentence is checked. These tasks are repeated for each sentence in the document until all of the sentences in the document have been checked for spelling and grammar or until the process is interrupted by the user.

The step of extracting one of the plurality of sentences from the document can be accomplished through sentence-breaking. Briefly described, sentence-breaking involves finding the beginning and end of a sentence in a buffer of text. Sentence-breaking is necessary because grammar checker program modules often require a single, complete sentence to effectively grammar check. The step of extracting can also be accomplished by calling a grammar checker program module, transferring a buffer of text to the grammar checker program module and receiving sentence indices from the grammar checker program module. The sentence indices indicate a beginning point and an end point for a sentence.

The step of checking the spelling of the words in the sentence can include the step of determining whether any of the words is a misspelled word. If any of the words is misspelled, then an indication of the misspelled word is provided. In response to this indication, the user can input a command that indicates the changes to be made to the misspelled word or the changes to be made to the sentence.

The step of checking the spelling of the words in the sentence also can include calling a spell checker program module and transferring one of the words of the sentence to the spell checker program module. The spell checker program module spell checks the word and, in response, receives spelling data. The spelling data is indicative of whether the spelling of the word is satisfactory or unsatisfactory. If unsatisfactory, then spelling error type information and suggestions are requested and received from the spell checker program module. The spelling error type information and suggestions are displayed to the user in a combined spelling and grammar dialog box. The user can then enter a command input to indicate any changes to the document. The spell checking steps are repeated until every word in the sentence has been spell checked.

More particularly described, the present invention provides a method for spell checking and grammar checking a document. A sentence is parsed from the document. It is determined whether any of the words in the sentence are misspelled and an indication, such as presenting the misspelled word in red, bold typeface, is provided for any misspelled words. In response, the user can then provide an input command that is indicative of the changes to be made to any misspelled words, such as ignore, change, etc. These steps are repeated until all of the misspelled words in the sentence have been indicated to the user.

It is then determined whether the sentence that was parsed from the document is grammatically proper. If not, an indication is provided to designate the portion of the sentence that is improper. For instance, the improper word or words may be displayed to the user in green, bold typeface. The user, in response, can provide an input command that indicates any changes for the sentence or document. Each grammatically improper portion of the sentence can be separately displayed.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 5 is a flow diagram illustrating the preferred method for verifying the accuracy of the spelling and grammatical composition of a document.

FIG. 6 is a flow diagram illustrating the preferred method for extracting a sentence from a document.

FIG. 8 is a flow diagram illustrating the preferred method for grammar checking a sentence.

DETAILED DESCRIPTION

Figure 1:
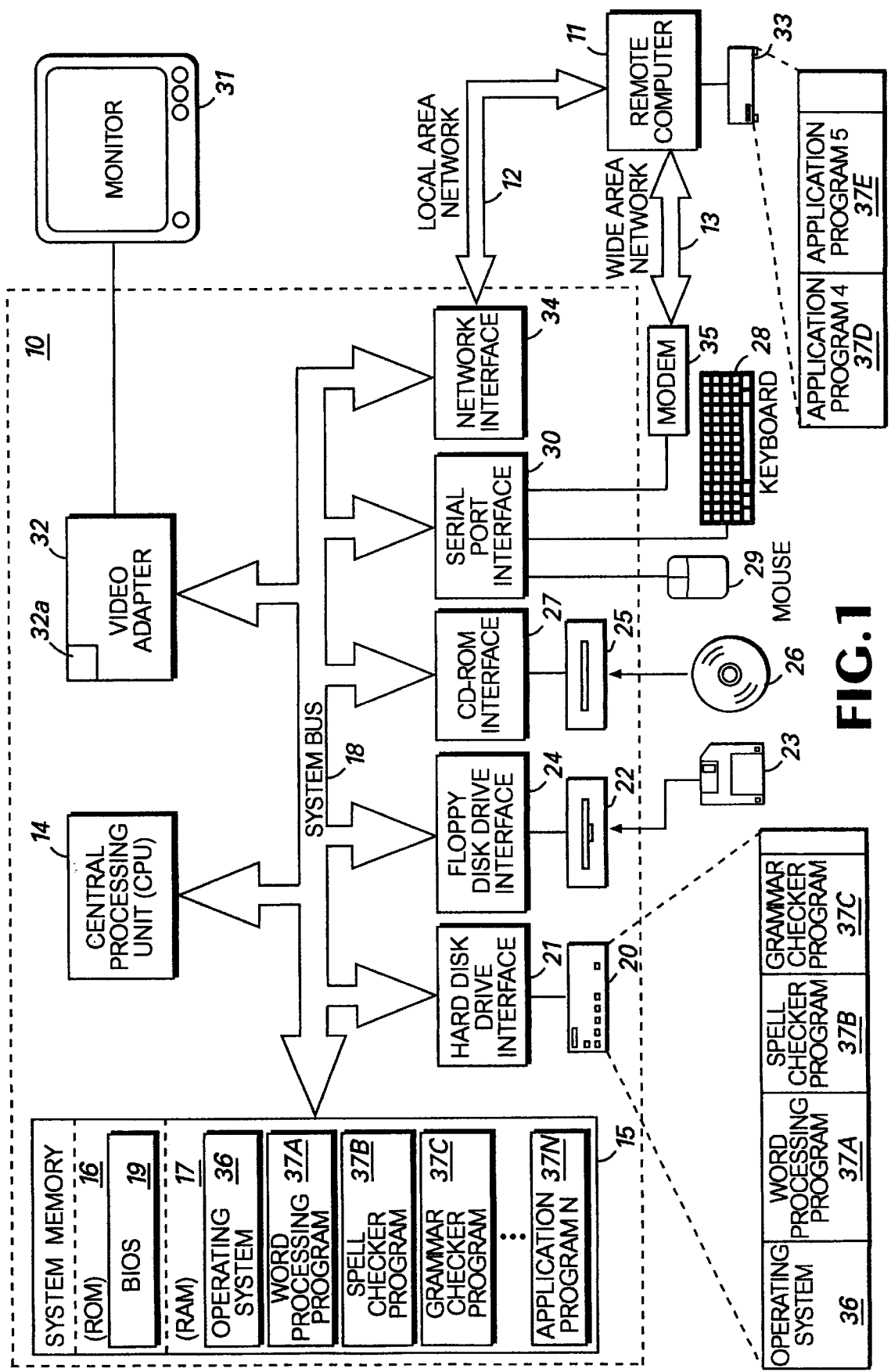
FIG. 1 is a block diagram of a personal computer that provides the operating environment for the preferred embodiment of the present invention.

The present invention is directed to a method and system for verifying the accuracy of the spelling of words in a document and the grammatical composition of sentences in a document. The preferred embodiment of the present invention is represented by "WORD", version 8.0, which is a word processing application program produced by Microsoft Corporation of Redmond, Wash. Briefly described, the preferred program allows users to create and edit electronic documents by entering characters, symbols, graphical objects, and commands. The preferred program includes a spell checker program module and a grammar checker program module. After a document has been created, a user may proof the document by conducting both spell checking and grammar checking operations in response to entering a single command.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, connected display devices, and input devices. Furthermore, these processes and operations may utilize conventional computer components in a heterogeneous distributed computing environment, including remote file servers, compute servers, and memory storage devices. Each of these conventional distributed computing components is accessible by the PU via a communication network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, transferring, transmitting, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

The Operating Environment

Figure 2:
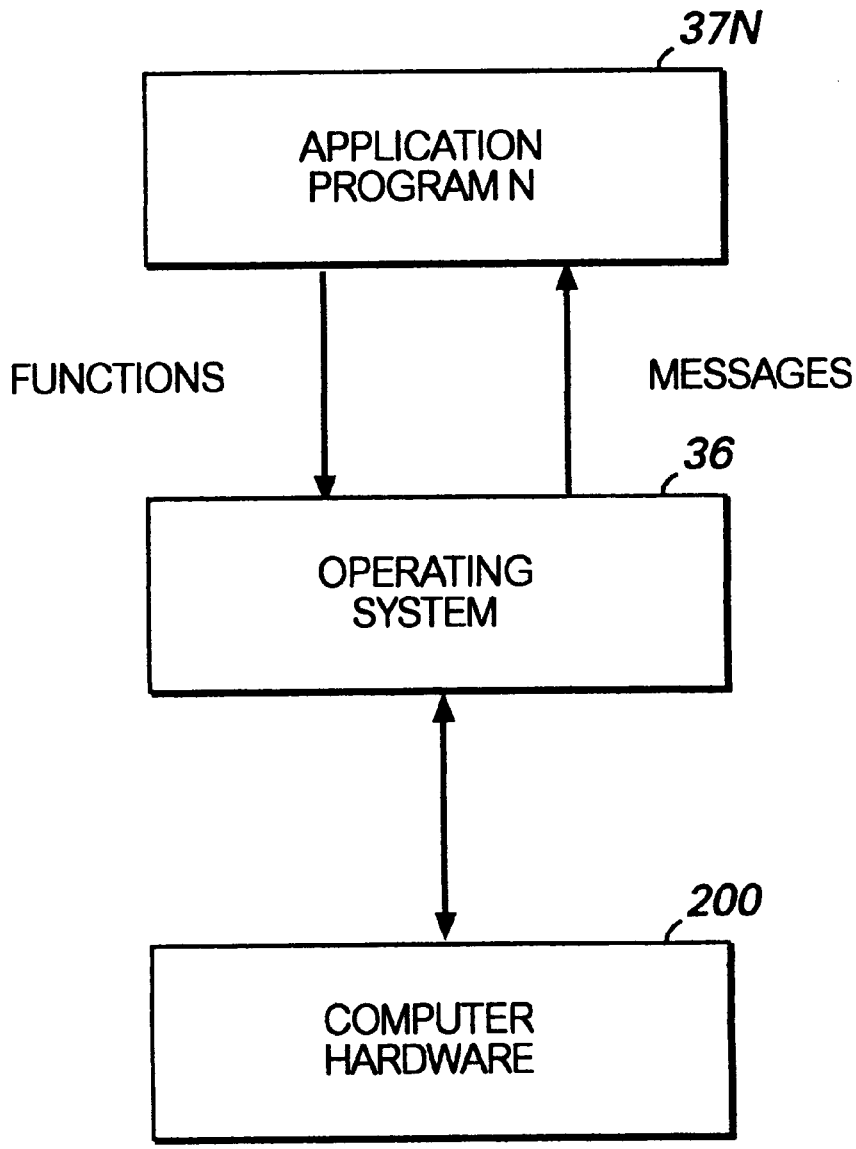
FIG. 2 is a block diagram illustrating the interface between a computer's input/output devices, an operating system, and an application program.

FIGS. 1 and 2 illustrate various aspects of the preferred computing environment in which the present invention is designed to operate. Those skilled in the art will immediately appreciate that FIGS. 1 and 2 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit (PU) 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the PU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write to a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. The application programs 37 may include a number of different programs such as a word processing program 37a, a spell checker program 37b, and a grammar checker program 37c. In the preferred personal computer 10, the local hard disk drive 20 is used to store data and programs, including the operating system and programs.

FIG. 2 is a simplified block diagram illustrating the interaction between the computer hardware 200, the operating system 36, and a typical application program 37n. Referring now to both FIGS. 1 and 2, when the personal computer 10 is turned on or reset, the Basic Input/Output System (BIOS) 19, which is stored in the ROM 16, instructs the PU 14 to load the operating system 36 from the hard disk drive 20 into the RAM 17. Once the operating system 36 is loaded into RAM 17, the PU 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the application program 37n. The operating system 36 interprets and carries out instructions issued by the user. For example, when the user wants to load an application program 37n, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37a is loaded into the RAM 17, it is executed by the PU 14. In case of large programs, the PU 14 loads various portions of program modules into RAM 17 as needed.

As discussed earlier, the preferred embodiment of the present invention is embodied in the "WORD" program, version 8.0, which is designed to operate in conjunction with Microsoft Corporation's "WINDOWS 95" or "WINDOWS NT" operating systems, or the operating system "MacOS" used in "MACINTOSH" computers manufactured by Apple Computer, Inc. However, it should be understood that the invention can readily be implemented in other operating systems, such as Microsoft Corporation's "WINDOWS 3.1" operating system or IBM Corporation's "OS/2" operating system.

The operating system 36 provides a variety of functions or services that allow an application program 37a to easily deal with various types of input/output (I/O). This allows the application program 37n to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37n communicates with the operating system 36 by calling predefined functions provided by the operating system 36. The operating system 36 responds by providing the requested information in a message or by executing the requested task.

From this brief description, it should be appreciated that operating systems, such as the "WINDOWS 95" and "WINDOWS NT" operating system, are quite complex and provide a wide variety of services that allow users and programs to utilize resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" published by Microsoft Press and "Advanced Windows" published by Microsoft Press.

The Common Grammar Application Programming Interface

The preferred program module includes a grammar checker program module. In the context of the present invention, the primary interaction between the preferred program and the grammar checker program module involves grammar checking related tasks. The preferred grammar checker program module conforms to the Common Grammar Application Programming Interface (CGAPI). The CGAPI is designed to make it easy for programmers to write applications that can utilize the grammar checker program module while being independent of the underlying grammar checker program module. The CGAPI provides functions that can be used to implement sophisticated grammar checking features with a relatively small amount of code.

It will be appreciated that the CGAPI provides a wide variety of features and functions in addition to those included in the brief description presented above. For additional information regarding the CGAPI, the reader may refer to the CGAPI documentation, entitled Common Grammar Application Programming Interface (CGAPI), which is published by Microsoft Corporation, and which is incorporated herein by reference.

The Common Spelling Application Programming Interface

The preferred program module includes a spell checker program module. In the context of the present invention, the primary interaction between the preferred program and the spell checker program module involves spell checking related tasks. The preferred spell checker program module conforms to the Common Speller Application Programming Interface (CSAPI). The CSAPI is designed to make it easy for programmers to write applications that can utilize the spell checking program module while being independent of the underlying spell checker program module. The CSAPI provides functions that can be used to implement sophisticated spell checking features with a relatively small amount of code.

It will be appreciated that the CSAPI provides a wide variety of features and functions in addition to those included in the brief description presented above. For additional information regarding the CSAPI, the reader may refer to the CSAPI documentation, entitled Common Speller Application Programming Interface (CSAPI), which is published by Microsoft Corporation, and which is incorporated herein by reference.

Spell Checking and Grammar Checking

Most word processor program modules include spell checker program modules and grammar checker program modules. At any time during or after the composition of a document, a user of one of these word processor program modules may spell check their document, i.e., check the accuracy of the spelling of their document, by executing a spell check command. However, in prior word processor program modules, the user had to execute a separate grammar check command to grammar check their document, i.e., check the accuracy of the grammatical composition of the document. Using these word processor program modules, two different commands have to be executed to proof a document by spell checking and grammar checking a document.

It should be understood that the description of spell checking and grammar checking a document described herein refers only to spell checking and grammar checking the "dirty text" in a document. Dirty text refers to text that has not been spell checked and/or text that has not been grammar checked. Dirty text is identified by flags, one flag for spell checking and one flag for grammar checking. For example, after a sentence has been spell checked and grammar checked, it is marked with a "clean" spell check flag and a "clean" grammar check flag. The flags indicate that the text does not need to be checked again by the spell and grammar check functions. It is possible for text to be "clean" for spell checking and "dirty" for grammar checking, and vice versa. After text has been marked "clean" for spelling, then the spell checker program module is able to skip over this text when spell checking. Similarly, when a range of text has been marked "clean" for grammar checking, then the grammar checker program module is able to skip over this text when grammar checking. Because "clean" text does not need to be checked, the speed of the spell checker program module and grammar checker program module is increased for the examination of a previously checked document. The algorithms for determining when to mark text "clean" and "dirty" are well-known in the art, and a complete description is beyond the scope of this document.

In most word processor program modules, the spell checker program module and grammar checker program module each have a separate user interface, or dialog. The commands associated with most spelling dialogs do not closely correspond to the commands of most grammar dialogs. Users must learn two different sets of commands for the spelling dialog and grammar dialog. The time and effort involved in learning two sets of commands and in executing two different checks, often makes users unlikely to execute both a spell check and grammar check when proofing a document. Thus, errors that may have been corrected by executing both a spell check and a grammar check often remain undetected.

Briefly described, the present invention provides a system for verifying the accuracy of spelling and grammatical composition of an electronic document. In the preferred program, the user selects the command "Spelling and Grammar" via a menu, toolbar or keyboard. The first sentence in the document is located and, in response, each word in the first sentence is spell checked by the spell checker program module. The sentence containing each spelling error, if any, detected by the spell checker program module is separately displayed to the user in a combined spelling and grammar screen display on the monitor with the spelling error displayed in red. When a spelling error is displayed in the combined spelling and grammar screen display, the user may enter commands to change the misspelled word, ignore the possible misspelling, or other commands as will be further described below.

After the words in the first sentence are checked for spelling and the user has entered commands regarding spelling errors, the grammatical composition of the first sentence is checked for errors by the grammar checker program module. If any grammatical errors are detected, they are separately displayed to the user in the combined spelling and grammar dialog box. For each possible grammatical error, the user enters commands to make changes to the sentence, to leave the sentence unchanged, or other commands as will be further described below.

In turn, the next sentence is selected for examination, the words of the next sentence are spell checked and then the sentence is grammar checked. The preferred program can repeat the tasks described above to check the entire document in a sentence-by-sentence manner until the entire document has been proofed.

Having briefly described the present invention, a more detailed description of the user interface, or combined spelling and grammar screen display, of the preferred program module will be presented below in reference to FIGS. 3 and 4. After this description of the user interface, a more detailed description of the disclosed embodiment will be presented in reference to FIGS. 5–8.

Figure 3:
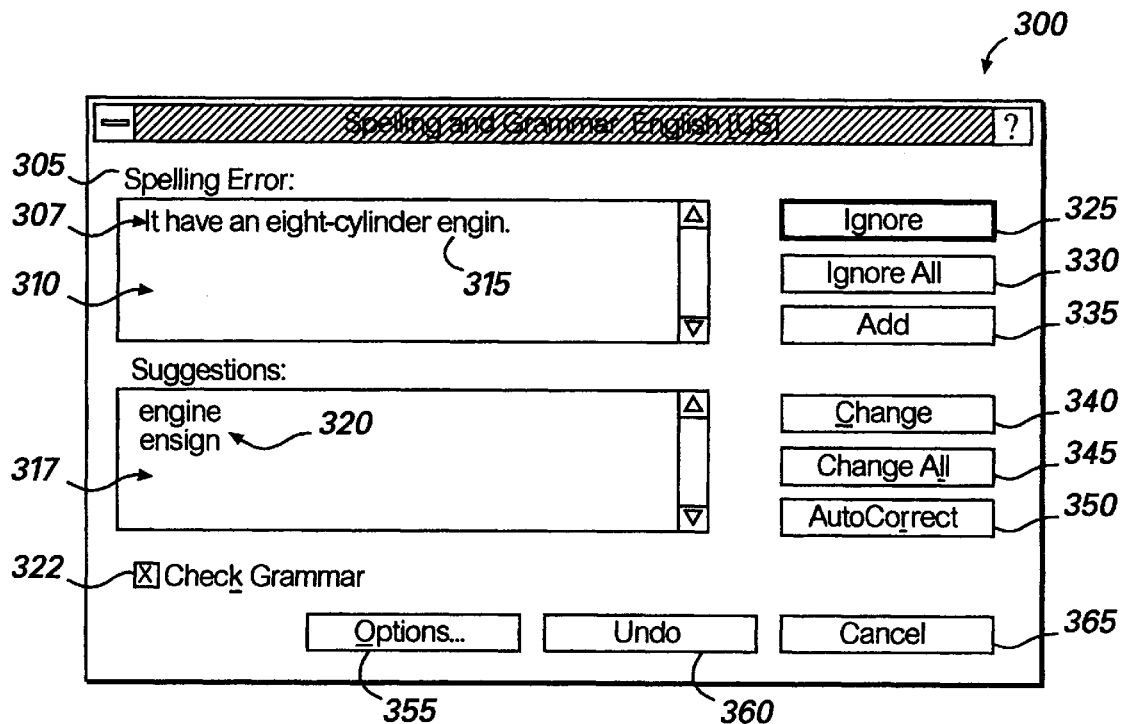
FIG. 3 is an illustration of the combined spelling and grammar dialog box that is displayed to the user when a possible spelling error is detected in accordance with the preferred embodiment of the present invention.
Figure 4:
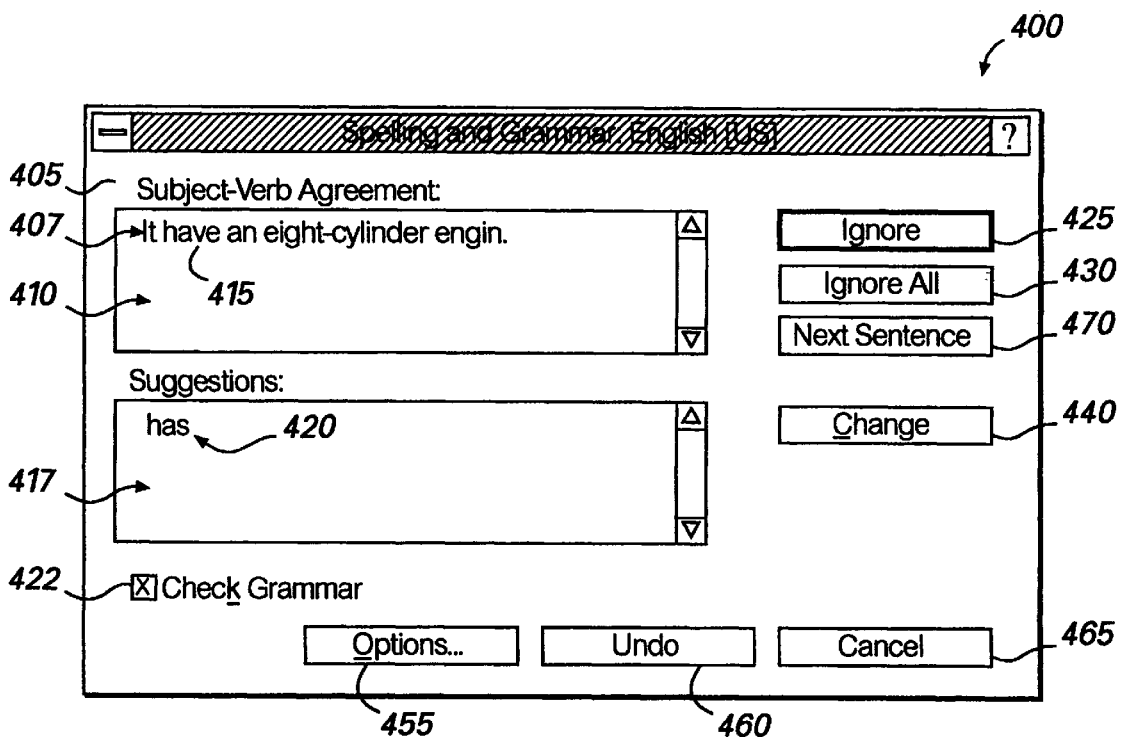
FIG. 4 is an illustration of the combined spelling and grammar dialog box that is displayed to the user when a possible grammatical error is detected in accordance with the preferred embodiment of the present invention.

FIGS. 3 and 4 are illustrations of a combined spelling and grammar dialog box that is displayed when the user selects the "Spelling and Grammar" command in the preferred application program and a possible error is subsequently found in the document being checked. The combined spelling and grammar dialog box illustrated in FIG. 3 is an example of the layout of the combined spelling and grammar dialog box presented in response to detecting an error by the spell checker program module. The combined spelling and grammar dialog box illustrated in FIG. 4 is an example of the layout of the combined spelling and grammar dialog box for an error detected by the grammar checker program module.

Turning to FIGS. 3 and 4, when a user of the preferred application program wants to check an electronic document for spelling errors and grammatical errors, the user executes the "Spelling and Grammar" command. The "Spelling and Grammar" command can be executed by selecting a command from a menu or toolbar displayed on the monitor 31. The "Spelling and Grammar" command can also be executed by entering a command on the keyboard 28. In the preferred application program, an user interface called a combined spelling and grammar dialog box is displayed on the monitor 31 when a possible spelling error or grammatical error has been detected.

The combined spelling and grammar dialog box 300 that is displayed for errors found by the spell checker program module is shown in FIG. 3. The combined spelling and grammar dialog box includes an error title line 305, a sentence 307, a rich text edit control (RTEC) field 310, a misspelled word 315, a suggestions list box 317, a suggestion list 320, a check grammar box 322, and command buttons 325, 330, 335, 340, 345, 350, 355, 360, and 365. The command buttons include an Ignore button 325, an Ignore All button 330, an Add button 335, a Change button 340, a Change All button 345, an Auto Correct button 350, an Options button 355, an Undo button 360, and a Cancel button 365.

When an error is detected in a sentence by the spell checker program module, the type of error that is found is displayed in the error title line 305. For example, in FIG. 3, the type of error in the sentence is a spelling error and thus, "Spelling Error" is displayed in the error title line 305. Other error types include, but are not limited to, "Improper Capitalization" and "Repeated Word".

The sentence 307 in which a spelling error has been detected is displayed in the RTEC field 310. In most prior art spell checker user interfaces, only the misspelled word is displayed in the user interface. By displaying the sentence rather than just the misspelled word, the preferred application program provides the user a context in which to decide whether the misspelled word is actually misspelled or is spelled correctly. For example, those skilled in the art will understand that some words, such as proper names, may not be recognized by the spell checker program module and may be flagged as spelling errors even though they are correctly spelled. By reading the entire sentence 307 in which the misspelled word appears, the user is better able to make the determination whether the spell checker program module has improperly flagged a correctly spelled word. In addition, the user is able to make modifications inside the sentence 307.

Still referring to FIG. 3, a misspelled word 315 in sentence 307 is displayed. In the preferred application program module, the misspelled word 315 is displayed in red, bold typeface. The misspelled word 315 is a word that does not match any of the words in the dictionaries of the spell checker program module and may possibly be misspelled. The misspelled word 315 may also be a word with which the spell checker program module detects a problem, such as a word that is repeated or that has improper capitalization.

A blinking cursor (not shown) is displayed to the right of the possible misspelled word 315 in the preferred application program. The blinking cursor allows the user to immediately make changes to the sentence 307 by typing on the keyboard 28 without first having to enter a command, such as clicking the mouse 29, to begin editing the sentence.

Another improved aspect of the rich text edit control field 310 is rich text editing. The sentence 307 in the rich text edit control field 310 may be changed in a number of ways by virtue of rich text editing. For example, the color, formatting, font, etc. of the sentence 307 may be changed in the RTEC field 310 without exiting the spell check session and returning to the preferred application program module.

Still referring to FIG. 3, the combined spelling and grammar dialog box 300 includes a suggestion list box 317. The suggestion list box 317 includes a plurality of suggestions 320 to replace the possible spelling error in the sentence 307. For example, in FIG. 3, the list of suggestions 320 includes "engine" and "ensign" to replace the misspelled word 315 "engin".

The combined spelling and grammar dialog box 300 also includes a check grammar box 322. The check grammar box 322 may be selected by the user to turn the grammar checker program module on and off. If the grammar checker program module is turned on, the user may select the grammar checker box 322 to turn the grammar checker program module off. If the grammar checker program module is turned off, the user may select the grammar checker box 322 to turn the grammar checker program module on. Thus, the user has the ability to opt out of grammar checking.

The combined spelling and grammar dialog box 300 also includes a plurality of command buttons 325–365 as mentioned above. Once the spelling and grammar dialog 300 is displayed, the user may select one of the command buttons 325–365 such as by clicking the mouse 29 on one of these command buttons. The operations that occur when each command button is selected will be described below.

If the user selects the Ignore button 325 for a spelling error, the current instance of the misspelled word 315 is skipped and the misspelled word remains unchanged. For example, in FIG. 3, if the user selects the Ignore button, then the misspelled word 315 "engin" would remain unchanged, but future occurrences of the word "engin" would be flagged by the spell checker program module. In addition, if the user selects the Ignore button 325, then the current instance of the misspelled word 315 is marked as "clean" for spelling.

Still referring to FIG. 3, the Ignore All button 330 is positioned below the Ignore button 325 in the combined spelling and grammar dialog box 300. If the user selects the Ignore All button 330 for a spelling error, all instances of the misspelled word 315 subsequently found in the document (or other documents) are skipped by the spell checker program module until the spell checker program module is quit. For example, in FIG. 3, if the user selects the Ignore All button 330, then every instance of the word "engin" in all documents will be skipped by the spell checking program module until the program module is quit. In other words, the spell checking program module will not flag the word "engin" as a misspelled word in any document that is being checked as long as the program module remains running. However, the spell checker program module will still check these words for other errors such as repeated words.

The Add button 335 is positioned below the Ignore All button 330 in the combined spelling and grammar dialog box 300. If the user selects the Add button 335 for a spelling error, then the misspelled word is added to the custom dictionary. The spell checking program module will then skip over every instance of the misspelled word, even in documents other than the present document that is being spell checked and even after the program module has been quit and restarted.

Still referring to FIG. 3, the Change button 340 is positioned below the Add button 335 in the combined spelling and grammar dialog box 300. If the user selects the Change button 340, the misspelled word 315 will be replaced with the word that has been selected by the user from the suggestions 320 in the suggestion list box 317. However, in the preferred application program, if the user has made changes to the sentence 307 in the rich text edit control 310, then selecting the Change button will incorporate these changes into the document. For example, in FIG. 3, if the user has selected the suggestion "engine" from the suggestion list box 317 and then selects the Change button, without editing the sentence in the rich text edit control field, then the misspelled word "engin" will be replaced with the suggestion "engine". However, again referring to FIG. 3, if the user has edited the sentence 307 in the rich text edit control field, then selecting the Change button 340 will incorporate these changes into the document.

The Change All button 345 is positioned below the Change button 340. If the user selects the Change All button 345, then every occurrence of the misspelled word in the document will be changed to the suggestion 320 selected by the user from the suggestion list box 317. For example, in FIG. 3, if the user selects the suggestion "engine" from the suggestion list box 317 and selects the Change All button, then all instances of the word "engin" in the document will be changed to "engine".

Still referring to FIG. 3, the AutoCorrect button 350 is positioned below the Change All button 345 in the combined spelling and grammar dialog box 300. If the user selects the AutoCorrect button 350, then every time that the user types the misspelled word 315 in the document (or in any other document until the user deletes the AutoCorrect entry) the misspelled word will be automatically changed to the suggestion 320 selected by the user from the suggestion list box 317. For example, in FIG. 3, if the user selects "engine" from the suggestion list box 317 and then selects the "AutoCorrect" button, then every time the user types "engin" the word "engin" will automatically be replaced with "engine" without any further action on the user's part.

Along the bottom of the combined spelling and grammar dialog box 300 are the Options button 355, the Undo button 360, and the Cancel button 365. If the user selects the Options button 355, an options dialog is displayed so that the user may choose certain spell checking options, such as which main dictionary to use to spell check the document, which custom dictionaries to use to check the document, whether to ignore words with capitalization, etc. If the user selects the Undo button 360, then the last change executed by the user will be undone. If the user selects the Cancel button 365, then the proofing session is terminated.

As mentioned above, the combined spelling and grammar dialog box 300 shown in FIG. 3 is displayed when the spell checker program module detects an error. When a grammatical error is detected by the grammar checker program module, the combined spelling and grammar dialog box changes slightly as shown in FIG. 4. The layout of the combined spelling and grammar dialog box is the same for spelling errors and grammar errors with the exception of the command buttons. Before discussing the changes in the command buttons, the rest of the combined spelling and grammar dialog box 400 will be briefly described to show the similarity in function and layout of the dialog for spelling errors and grammatical errors.

Referring to FIG. 4, the combined spelling and grammar dialog box 400 includes an error title line 405 that displays the type of grammatical error found by the grammar checker program module, such as "Subject-Verb Agreement". The sentence 407 in which a grammatical error has been found is displayed in a RTEC field 410. The grammatically incorrect word or words 415 are displayed in green, bold typeface by the preferred application program.

The combined spelling and grammar dialog box 400 includes a suggestion list box 417 that includes suggestions 420 for replacing the grammatically incorrect word 415. The combined spelling and grammar dialog box 400 also includes a check grammar box 422 and command buttons 455, 460 and 465 that function in a manner similar to elements 322, 355, 360, and 365 described above in reference to FIG. 3.

As can be clearly seen, the combined spelling and grammar dialog box has a similar layout whether the error is a spelling error (FIG. 3) or a grammatical error (FIG. 4). However, there are some minor differences in the command buttons depending on whether the error is spelling or grammatical. For grammatical errors, the combined spelling and grammar dialog box 400 displayed to the user includes an Ignore button 425, an Ignore All button 425 and a Change button 440 in the same locations as for spelling errors. However, for grammatical errors, the combined spelling and grammar dialog box 400 does not include a Change All button or an AutoCorrect button. In addition, the Add button, which is displayed for spelling errors, is replaced with a "Next Sentence" button 470 for grammar checking. The functions of the Ignore button 425, the Ignore All button 430, the Change button 440, and the Next Sentence button 470 for grammatical errors will be described below in reference to FIG. 4.

If the user selects the Ignore button 425, then the current instance of a grammatical error is skipped. For example, in FIG. 4, the current instance of the subject-verb agreement grammatical error "have" will be skipped if the Ignore button 425 is selected by the user. As should be clearly understood, the function associated with the Ignore button 425 is similar to the function for the Ignore button 325 which, when selected, causes the spell checker program module to skip the current instance of the spelling error.

If the user selects the Ignore All button 430, then every instance of the grammatical error generated by the present grammar rule will be ignored by the grammar checker program module. For example, in FIG. 4, if the user selects the Ignore All button 430, then every instance of a grammatical error involving the same particular subject-verb agreement grammar rule will be skipped by the grammar checker program module for this document. The function associated with the Ignore All button 430 is similar to the function for the Ignore All button 330 for spelling errors.

If the user selects the Change button 440, then the grammatical error will be replaced with the word that has been selected by the user from the suggestions 420 in the suggestion list box 417. However, in the preferred application program, if the user has made changes to the sentence 407 in the RTEC field 410, then selecting the Change button 440 will incorporate these changes into the document. For example, in FIG. 4, if the user has selected the suggestion "has" from the suggestion list box 417 and then selects the Change button 440 without editing the sentence in the RTEC field 410, then the current instance of the grammatical error "have" will be replaced with the suggestion "has". However, again referring to FIG. 4, if the user has edited the sentence 407 in the RTEC field 410, then selecting the Change button 440 will incorporate these changes into the document. It will be appreciated that the function associated with the Change button 440 is similar to the function for the Change button 340.

If the user selects the Next Sentence button 470, then the grammar checker program module ignores every grammatical error in the sentence 407. Preferably, any changes made to the sentence 407 in the RTEC field 410 will also be incorporated into the document when the user selects the Next Sentence button 470 because this is the action that most users expect when they makes changes in the RTEC field 410.

As can be understood from the above description, the user need only learn a few different commands to master the functions offered by the combined spelling and grammar dialog box because the command buttons for spelling errors and grammatical errors are similar. In addition, it will be appreciated that the layout of command buttons for the combined spelling and grammar dialog box is logical based on the grouping of command buttons having similar functions. For example, buttons that ignore an error, such as the Ignore button 325, 425, the Ignore All button 330, 430, the Add button 335 and Next Sentence button 470, are displayed together in the combined spelling and grammar dialog box. Also, the buttons that make changes to the sentence such as the Change button 340, 440, the Change All button 345 and the AutoCorrect button 350 are displayed together in the combined spelling and grammar dialog box.

It will be understood that the combined spelling and grammar dialog box switches automatically between the layout shown in FIG. 3 and the layout shown in FIG. 4 based upon whether the error being displayed is spelling related or grammar related. The user is not required to spell check the document and then grammar check the document.

FIG. 5 is a flow diagram illustrating the preferred method 500 by which the accuracy of the spelling and grammatical composition of a document is verified. Those skilled in the art will appreciate that the present invention is a computer-implemented process that is carried out by the computer in response to input from the user and instructions provided by the preferred application program module, the preferred spell checker program module, and the preferred grammar checker program module.

The method 500 begins at start step 505 and proceeds to step 510 when the user selects the "Spelling and Grammar" command. As described above, the user selects the "Spelling and Grammar" command when the user wants to check an electronic document for spelling errors and grammatical errors. In the preferred application program, the "Spelling and Grammar" command can be executed by selecting a command from a menu or toolbar of the user interface displayed on the monitor 31. Typically, the user can position a cursor over the desired command button or menu item and select the down position of the mouse button, i.e., by clicking the mouse. The "Spelling and Grammar" command can also be executed by entering a command on the keyboard 28.

At step 510, a sentence is extracted from the document. Preferably, a sentence is extracted by separating the document into sentences. Those skilled in the art will recognize this process as sentence-breaking. Briefly described, sentence-breaking involves finding the beginning and end of a sentence in a buffer of text. Sentence-breaking is often necessary because grammar checker program modules often require a single, complete sentence to effectively grammar check. Most word processor program modules contain functionality to sentence-break a document into sentences. However, preferably, the sentence-breaking is performed by the grammar checker program module, as will be more fully described in reference to FIG. 6.

After a sentence is extracted at step 510, the sentence is spell checked at step 515. After the sentence is spell checked at step 515, it is determined whether to grammar check the sentence at decision step 517. If the user has cleared the check grammar box 322 so that there is not an "X" visible in the check grammar box, then the user has disabled the grammar check function and the sentence is not grammar checked. The method proceeds from decision step 517 to step 525. Thus, the user is provided with the ability to opt out of grammar checking if the user so desires.

However, if the user has checked the check grammar box 322 so that there is an "X" visible in the check grammar box at decision step 517, then the sentence is grammar checked at step 520. Once the sentence is grammar checked at step 520, it is determined whether there is any more text in the document to proof at decision step 525. If there is more text in the document to proof, then the method returns to step 510 and another sentence is extracted. If there is no more text to proof at decision step 525, then the method ends at step 530. A more detailed description of the steps of the preferred method will be described below in reference to FIGS. 6–8.

FIG. 6 is a flow diagram illustrating the preferred process to execute step 510 of FIG. 5, i.e., extracting a sentence from the document. Referring to FIG. 6, at step 605, the process begins when the user selects the "Spelling and Grammar" command and the grammar checker program module is called to initiate a grammar checking session. The grammar checker program module is preferably called by the preferred application program. As discussed above, commands to the grammar checker program module are preferably made by using functions described in the Common Grammar Application Programming Interface (CGAPI), which is published by Microsoft Corporation of Redmond, Wash. The preferred CGAPI function to initiate a grammar checking session is GramInit.

After the grammar checker program module is called at step 605 and a grammar checking session is initiated, a buffer of text from the document being proofed is transferred to the grammar checker program module at step 610.

At step 615, the grammar checker program module determines the beginning and end of a sentence from the buffer of text that was transferred to the grammar checker program module in step 610. The sentence that is located by the grammar checker program module is the sentence that will be spell checked and grammar checked. As those skilled in the art will understand, to locate a sentence, the CGAPI function GramCheck is initiated. Then, an argument called "grammar check command code", or gcc, is initiated which lets the application program module choose between tasks such as verify buffer, report sentence limits, generate statistics, etc. In response to the grammar check command code, the grammar checker program module sends sentence indices indicative of the beginning point and end point of the sentence to the preferred application program module at step 620.

Of course, those skilled in the art will understand that the process described above in reference to steps 605–620 is a sentence-breaking process. Preferably, the sentence-breaking is performed by the grammar checker program module as described above. However, the sentence-breaking can be performed in another manner such as by the preferred application program module.

Referring to FIG. 5, after a sentence is extracted from the document, the sentence is spell checked at step 515. The preferred steps for the process 515 of spell checking the sentence are illustrated in the flow diagram of FIG. 7.

Figure 7:
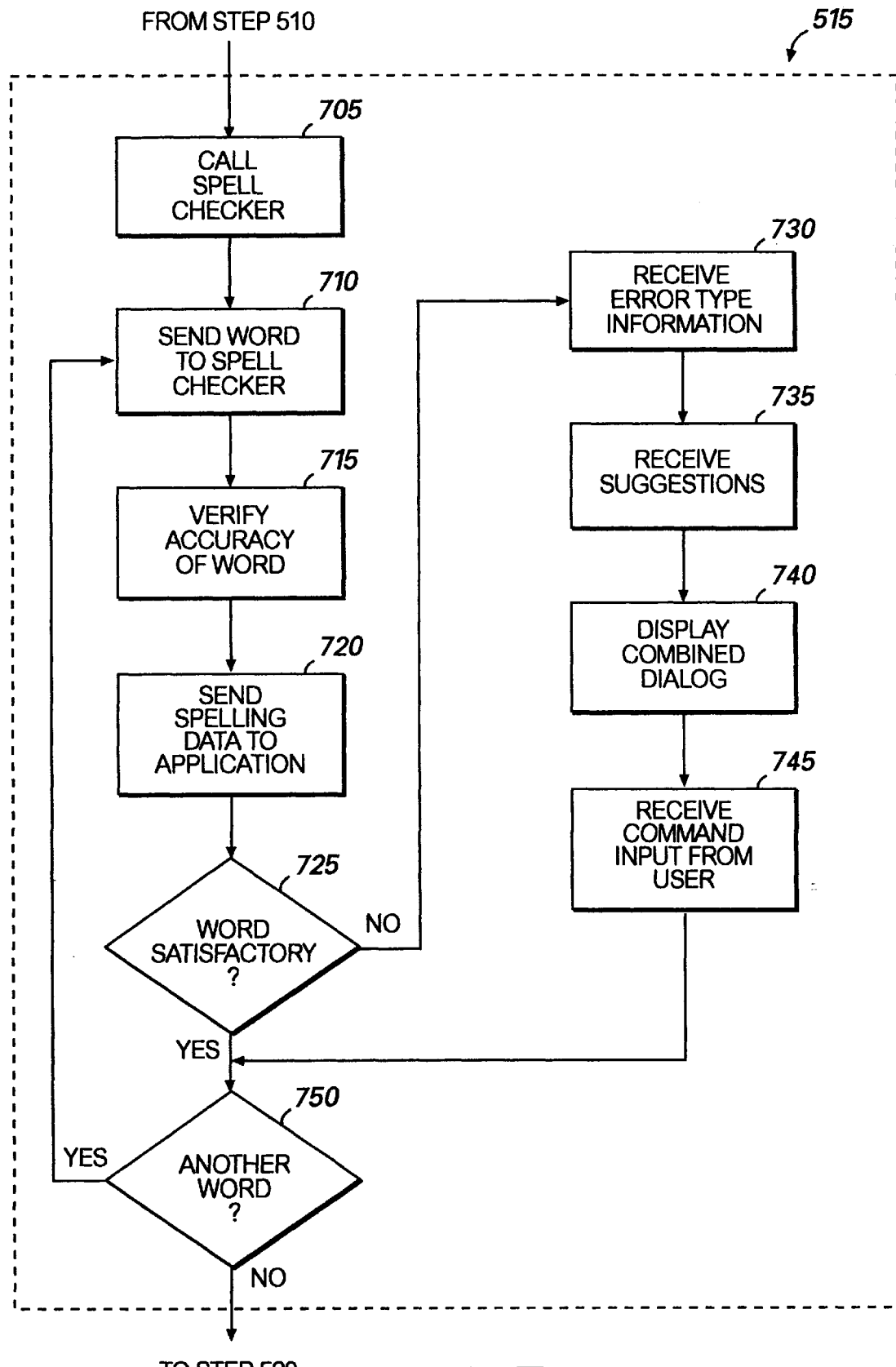
FIG. 7 is a flow diagram illustrating the preferred method for spell checking a sentence.

Referring to FIG. 7, the spell checker program module is called at step 705 and a spell checking session is initiated. Preferably, the spell checker program module is called by the preferred application program module. As mentioned above, commands to the spell checker program module are preferably made by using the functions described in the Common Spelling Application Programming Interface (CSAPI), which is published by Microsoft Corporation. The preferred CSAPI function to call a spell checker and initiate a spell checking session, is SpellInit.

Still referring to FIG. 7, a word in the sentence is sent to the spell checker program module at step 710. As those skilled in the art will understand, the preferred application program module is able to determine the words in a sentence based on the spaces and other punctuation (e.g., hyphens, dashes, etc.) between words in a sentence. The preferred application program module then sends a word of the sentence to the spell checker program module. The first word of the sentence is sent to the spell checker program module and, in turn, each succeeding word in the sentence is sent to the spell checker program module after the preceding word has been spell checked. It will be appreciated by those skilled in the art that it may be preferable in some instances to send the entire sentence to the spell checker program module for spell checking of the words in the sentence. In the case of the entire sentence being sent to the spell checker program module, the spell checker program module can break the sentence into words based upon the spaces and other punctuation between the words in the sentence.

At step 715, the spell checker program module verifies the accuracy of the spelling of the word. A spell checker program includes a standard dictionary with a list of words that are found in a standard dictionary. In addition, spell checker program modules typically include custom dictionaries. These custom dictionaries include terms entered by a user of the spell checker program module, such as specialized terms, acronyms, abbreviations, and any other terms entered by the user. As is well-known in the art, a spell checker program module checks the spelling of a word by comparing the word to the list of words in the standard dictionary and custom dictionaries. If the word does not correspond to one of the words in the standard dictionary or custom dictionaries, then the spell checker program module flags the word as a word that is possibly misspelled. In addition to verifying the spelling of the word at step 715, most spell checker program modules also check for inaccuracies in the word, such as a word that has been repeated or a word with improper capitalization.

Preferably, the spell checker program module verifies the accuracy of the spelling of the word at step 715 in response to a CSAPI function from the preferred application program module. The preferred CSAPI function to check the spelling of one or more words is SpellCheck.

After the spell checker program module has verified the accuracy of the spelling of the word, the spell checker program module sends spelling data to the preferred application program module at step 720. The spelling data is indicative of whether or not the word sent to the spell checker at step 710 corresponds to a word in a dictionary of the spell checker program module. The preferred application program module receives the spelling data from the spell checker program module.

At decision step 725, the preferred application program module reviews the spelling data to determine whether the word is satisfactory. Preferably, the spelling data is binary data that either indicates the word is satisfactory or unsatisfactory. If the spelling data indicates that the word is unsatisfactory, then the method proceeds to step 730.

At step 730, the preferred application program module consults a structure called a Spell Check Return Status field in a Spell Return Buffer (SRB) to determine the type of spelling error. When the CSAPI function SpellCheck is called, the spell checker program module returns the SRB. The SRB includes a field called a Spell Check Return Status (SCRS). The SCRS is an integer code that the application program module consults to determine the error type information. The error type information indicates the type of spelling error detected by the spell checker program module. For example, most typical spell checker program modules include the ability to detect possible errors such as "word not in dictionary", "repeated word", and "capitalization".

After receiving the error type information at step 730, the preferred application program consults another part of the SRB to locate a string buffer containing suggestions from the spell checker program module at step 735. The suggestions are the information that is displayed in the suggestions list box 317 as shown in FIG. 3.

After receiving suggestions from the spell checker program module at step 735, the preferred application program module displays the combined spelling and grammar dialog box such as is shown in FIG. 3. The entire sentence in which the spelling error occurs is displayed. The word in which the possible spelling error occurs is displayed in red, bold typeface in the preferred application program module. The suggestions received at step 735 are displayed in the suggestions list box 317 as shown in FIG. 3. The error type information received at step 730 is displayed in the error title line 305 as shown in FIG. 3.

At step 745, input from the user is received. The user inputs a command by selecting one of the command buttons, 325, 330, 335, 340, 345, 350, 355, 360, or 365 described in reference to FIG. 3. The preferred application program performs the appropriate steps in response to the user selecting one of these command buttons.

After the user inputs a command and the preferred application program executes the appropriate steps in response to this command at step 745, the method proceeds to decision step 750. Returning to decision step 725, if the word was determined to be satisfactory, then the method also proceeds to decision step 750.

It should be understood that after input is received from the user at step 745 that the word may be rechecked using the method outlined in steps 705–745. This allows the spell checker program module to flag repeated words or to recheck a word entered by the user.

At decision step 750, it is determined whether there is another word in the sentence to spell check. If the preferred application program determines there is another word in the sentence to spell check, then the method returns to step 710. If it is determined there are no more words in the sentence to spell check, then the method proceeds to step 520 of FIG. 5 for grammar checking of the sentence. It is important to note that spell checking of the sentence is preferably completed before grammar checking a sentence. This is because most grammar checker program modules require a sentence with properly spelled words in order to recognize the words and determine whether the words are nouns, verbs, adjectives, adverbs, etc.

Referring to FIG. 5, the sentence is grammar checked at step 520. The preferred process for grammar checking the sentence is illustrated in the flow diagram of FIG. 8. Referring to FIG. 8, the grammar checker program module is called at step 805 and a grammar checking session is initiated. Preferably, the grammar checker program module is called by the preferred application program module. As mentioned above, commands to the grammar checker program module are preferably made using the functions described in the Common Grammar Application Programming Interface (CGAPI) published by Microsoft Corporation. The CGAPI function to call a grammar checker and initiate a grammar checking session, is GramInit.

The sentence is sent to the grammar checker program module at step 810. It is important to note that the sentence sent to the grammar checker program module incorporates any changes made to the sentence in the spell checking process described in reference to FIG. 7. For example, if the sentence originally was "The boy is sikc." and was corrected to "The boy is sick." in the spell checking process, then the corrected sentence "The boy is sick." would be sent to the grammar checker at step 810.

At step 815, the grammar checker program module verifies the accuracy of the grammatical composition of the sentence. As is well-known in the art, a grammar checker program module verifies the accuracy of the grammatical composition of a sentence by applying common grammar rules such as subject-verb agreement. If the sentence violates one of the rules in the grammar checker program module, then the grammar checker program module flags the sentence as a sentence that is possibly grammatically incorrect.

Preferably, the grammar checker program module verifies the accuracy of the grammatical composition of the sentence at step 815 in response to a CGAPI function from the preferred application program module. The CGAPI function to check the grammar of a sentence is GramCheck.

After the grammar checker program module has verified the accuracy of the grammatical composition of the sentence, the grammar checker program module sends grammar data to the preferred application program module at step 820. The grammar data is indicative of whether or not the sentence sent to the grammar checker at step 810 violates a grammar rule of the grammar checker. The preferred application program module receives the grammar data from the grammar checker program module.

Still referring to FIG. 8, at decision step 825, the preferred application program module reviews the grammar data to determine whether the sentence is satisfactory. The preferred application program determines whether there were any errors found during the grammar check session. If any grammatical errors were found in the grammar check session, then the method proceeds to step 830.

At step 830, the preferred application program module requests and receives grammatical error type information from the grammar checker program module. The CGAPI function to request information about the type of grammar error is GramGetError. Preferably, the GramGetError function returns a Grammar Error Buffer (GEB) which includes grammar error type information and suggestions. The grammar error type information is determined by reading a field set by the grammar checker program module to correspond to the type of error found by the grammar checker program module. For example, most typical grammar checker program modules detect possible errors such as "subject-verb agreement". A field will be set to different values by the grammar checker program module to identify the type of grammatical error in the sentence.

After receiving the information about the type of grammatical error at step 830, the preferred application program consults the grammatical suggestions in the GEB at step 835. The grammatical suggestions are the information that is displayed in the suggestions list box 417 shown in FIG. 4.

After receiving grammatical suggestions from the grammar checker program module, the preferred application program module, at step 840, displays the combined spelling and grammar dialog box such as is shown in FIG. 4. The entire sentence in which the grammatical error occurs is displayed. The word in which the possible grammatical error occurs is displayed in green, bold typeface by the preferred application program module. The suggestions 420 received at step 835 are displayed in the suggestions list box 417.

At step 845, input commands from the user are received. The input is one of the command buttons 425, 430, 440, 455, 460, 465 or 470 described in reference to FIG. 4. The preferred application program performs the appropriate steps in response to the user selecting one of the command buttons as was described in reference to FIG. 4.

At decision step 850, it is determined whether there are any other grammatical errors in the sentence. If there are any more grammatical errors, then the method returns to step 830. If there are not any more grammatical errors in the sentence, then the method proceeds to step 525 of FIG. 5.

Another embodiment of the present invention uses idle time spell checking and idle time grammar checking. Idle time checking refers to the process of checking in a document for errors while waiting for a command input from the user. For example, if the spell checker program module detects a spelling error, the combined spelling and grammar dialog box will be displayed to the user. While waiting for a response to the user, i.e., a command input, the spell checker program module will check the rest of the sentence for errors. During this idle time, more of the sentence may be checked and the process of proofing the document takes less time.

From the foregoing description, it will be apparent to those skilled in the art that the present invention provides an improved system for verifying the accuracy of spelling and grammatical composition of an electronic document. The user simply has to execute one command to proof the document. In addition, the present invention provides an improved user interface, the combined spelling and grammar dialog box. The user only has to become familiar with a few commands in the combined spelling and grammar dialog box to search for and correct spelling or grammatical errors. In addition, the layout of the command buttons for the combined spelling and grammar dialog box is arranged logically based on common functions shared by a grouping of commands.

Although the present invention is described in the context of a spell checker program module and a grammar checker program module, it should be understood that the present invention can be implemented with other "document proofing" tools, such as a consistency checker program module or a style checker program module. For example, a spell checker program module and a style checker program module could be implemented such that the spelling and style errors are checked and the errors found by these program modules are presented in a combined dialog box.

Alternative embodiments will become apparent to those skilled in the art to which the present invention pertains without departing from its spirit and scope. Accordingly, the scope of the present invention is defined by the appended claims rather than the foregoing description.

What is claimed is:

1. In an electronic word processing system for creating and editing a document, the document comprising a plurality of sentences, a method for verifying the accuracy of spelling and grammatical composition of the plurality of sentences in the document, the method comprising the steps of:

performing a first sequence comprising the steps of:
extracting one of the plurality of sentences from the document, the sentence comprising a plurality of words;
checking the spelling of each word in the sentence for a misspelled word in a spell checker program module;
displaying the sentence and each misspelled word within a first instance of a combined spelling and grammar dialog box;
displaying a plurality of common command buttons operative for correcting the spelling errors; and performing a second sequence, subsequent to the first sequence, comprising the steps of:
  checking the grammatical composition of the sentence in a grammar checker program module;
  displaying the sentence and the grammatical errors within a second instance of the combined spelling and grammar dialog box; and
  displaying the plurality of common command buttons operative for correcting the grammatical errors.

2. The method recited in claim 1, further comprising the step of repeating the first sequence and the second sequence until the spelling and grammatical composition of each of the plurality of sentences in the document has been verified.

3. The method recited in claim 1, wherein the step of extracting one of the plurality of sentences from the document comprises the step of sentence-breaking to determine a beginning and an end of the sentence of the plurality of sentences.

4. The method recited in claim 1, wherein the step of extracting one sentence of the plurality of sentences from the document comprises the steps of:
  calling a grammar checker program module;
  transferring a buffer of text to the grammar checker program module, the buffer of text comprising at least one of the plurality of sentences; and
  receiving sentence indices from the grammar checker program module, the sentence indices indicative of a beginning and an end of the sentence.

5. The method recited in claim 1, wherein the step of checking the spelling of the plurality of words in the sentence comprises the steps of:
  determining whether any of the plurality of words is a misspelled word;
  if any of the plurality of words is a misspelled word, then providing an indication of the misspelled word in the first instance of the combined spelling and grammar dialog box; and
  receiving a command input that corresponds to one of the plurality of command buttons indicative of a change to the misspelled word or an acceptance of the misspelled word.

6. The method recited in claim 1, wherein the step of checking the spelling of the plurality of words comprises a spell checking sequence comprising the steps of:
  calling the spell checker program module;
  transferring one of the plurality of the words to the spell checker program module;
  receiving spelling data from the spell checker program module, the spelling data indicative of whether the spelling of the word is satisfactory;
  determining if the spelling data is indicative of the word not being satisfactory;
    in response to determining that the spelling data is indicative of the word not being satisfactory,
    receiving spelling error type information from the spell checker program module;
    displaying the spelling error type information in the first instance of the combined spelling and grammar dialog box; and
      receiving a command input that corresponds to one of the plurality of common command buttons indicative of a change to the misspelled word or an acceptance of the misspelled word; and
    repeating the spell checking sequence until all of the plurality of words in the sentence has been checked for spelling.

7. The method recited in claim 1, wherein the step of checking the grammatical composition of one of the plurality of sentences comprises the steps of:
  determining whether the sentence is of proper grammatical composition;
  if the sentence is not of proper grammatical composition, then providing an indication of a portion of the sentence that is not of proper grammatical composition in the second instance of the combined spelling and grammar dialog box; and
  receiving a command input corresponding to one of the plurality of common command buttons indicative of an acceptance of the portion of the sentence or a change to be made to the portion of the sentence.

8. The method of claim 1, wherein the step of checking the grammatical composition of the sentence comprises the steps of:
  calling the grammar checker program module;
  transferring the sentence to the grammar checker program module;
  receiving grammatical data from the grammar checker program module, the grammatical data indicative of whether the grammatical composition of the sentence is satisfactory;
  if the grammatical data is indicative of the grammatical composition of the sentence being unsatisfactory, performing a grammar checking sequence comprising the steps of:
    receiving grammatical error type information from the grammar checker program module;
    receiving at least one suggestion or an indication of no suggestions from the grammar checker program module;
    displaying the grammatical error type information and each suggestion in the second instance of the combined spelling and grammar dialog box;
    receiving a command input that corresponds to one of the plurality of common command buttons indicative of an acceptance of the sentence or indicative of a change to be made to the sentence; and
  repeating the grammar checking sequence until all of the grammatical error type information and each suggestion for each one of the plurality of the sentences has been displayed in the combined spelling and grammar dialog box.

9. The method recited in claim 1, further comprising the step displaying the sentence containing the misspelled word in a rich text edit field (RTEC) field within the first instance of the combined spelling and grammar dialog box to allow editing of the sentence.

10. The method recited in claim 1, further comprising the step displaying the sentence containing the grammatical error in a RTEC field within the second instance of the combined spelling and grammar dialog box to allow editing of the sentence.

11. In an electronic word processing system for creating and editing a document, the document comprising a plurality of sentences, a method for verifying the accuracy of spelling and grammatical composition of the plurality of sentences in the document, the method comprising the steps of:
  performing a first sequence comprising the steps of:
    extracting one of the plurality of sentences from the document, the sentence comprising a plurality of words;
    checking each word in the sentence for a misspelled word in a spell checker program module;

displaying the sentence containing the misspelled word in a rich text edit control (RTEC) field within a first instance of a combined spelling and grammar dialog box to allow editing of the sentence;

indicating each spelling error contained in the sentence displayed in the RTEC field;

displaying a suggestion list containing a first plurality of suggestions in a suggestions list box within the first instance of the combined spelling and grammar box operative for replacing the misspelled word;

displaying a plurality of common command buttons within the first instance of the combined spelling and grammar box operative for replacing the misspelled word; and performing a second sequence, subsequent to the first sequence, comprising the steps of:

checking the grammatical composition of the sentence in a grammar checker program module;

displaying the sentence in the RTEC field within a second instance of the combined spelling and grammar dialog box to allow editing of the sentence;

displaying the suggestion list containing a second plurality of suggestions in the suggestions list box within the second instance of the combined spelling and grammar box operative for correcting the grammatical errors; and displaying the plurality of common command buttons operative within the second instance of the combined spelling and grammar dialog box for replacing the grammatical errors.

12. The method recited in claim 9, further comprising the step of repeating the spell checking sequence and the grammar checking sequence until the spelling and grammatical composition of each of the plurality of sentences in the document has been verified.

13. The method recited in claim 9, wherein the step of checking the spelling of the plurality of words comprises a spell checking sequence comprising the steps of:

calling a spell checker program module;

transferring one of the plurality of the words to the spell checker program module;

receiving spelling data from the spell checker program module, the spelling data indicative of whether the spelling of the word is satisfactory;

determining if the spelling data is indicative of the word not being satisfactory;

in response to determining that the spelling data is indicative of one of the plurality of words not being satisfactory, receiving spelling error type information from the spell checker program module;

displaying the spelling error type information in the first instance of the combined spelling and grammar dialog box; and receiving a command input that corresponds to one of the plurality of common command buttons indicative of a change to the misspelled word or an acceptance of the misspelled word; and repeating the spell checking sequence until all of the plurality of words in the one of the plurality of sentences has been checked for spelling.

14. The method of claim 1, wherein the step of checking the grammatical composition of the sentence comprises the steps of:

calling the grammar checker program module;

transferring the sentence to the grammar checker program module;

receiving grammatical data from the grammar checker program module, the grammatical data indicative of whether the grammatical composition of the sentence is satisfactory;

if the grammatical data is indicative of the grammatical composition of the sentence being unsatisfactory, performing a grammar checking sequence comprising the steps of:

receiving grammatical error type information from the grammar checker program module;

receiving at least one suggestion or an indication of no suggestions from the grammar checker program module;

displaying the grammatical error type information and each suggestion in the second instance of the combined spelling and grammar dialog box;

receiving a command input that corresponds to one of the plurality of common command buttons via the combined spelling and grammar dialog box indicative of an acceptance of the sentence or indicative of a change to be made to the sentence; and repeating the grammar checking sequence until all of the grammatical error type information and each suggestion for each of the plurality of the sentences has been displayed in the second instance of the combined spelling and grammar dialog box.

15. In an electronic word processing system for creating and editing a document, the document comprising a plurality of sentences, a combined spelling and grammar dialog box for displaying both spelling and grammatical errors in one of the plurality of sentences in the document comprising:

a rich text edit command (RTEC) field for displaying both spelling and grammatical errors found within the sentence and editing the sentence;

an error title line for indicating whether the error displayed in the RTEC field is a spelling error or a grammatical error;

a suggestions list box for displaying a suggestions list, the suggestions list comprises a fist plurality of suggestions operative for correcting the spelling error found if the error type displayed in the error title line indicates a spelling error, or the suggestions lists comprises a second plurality of suggestions for correcting the grammatical error found if the error type displayed in the error title lined indicates a grammatical error;

a plurality of common command buttons operative for correcting both errors in the spelling and in the grammatical composition of the sentence displayed in the RTEC field.

* * * * *